United States Patent [19]
Alpers

[11] 3,903,361

[45] Sept. 2, 1975

[54] CENTER TRACKING ELECTRO-OPTICAL GUIDANCE SYSTEM

[75] Inventor: Frederick C. Alpers, Riverside, Calif.

[73] Assignee: United States of America as represented by the Secretary of the Navy, Washington, D.C.

[22] Filed: Apr. 24, 1964

[21] Appl. No.: 355,147

[52] U.S. Cl............................ 178/6.8; 178/DIG. 21
[51] Int. Cl. .......................... H04n 3/00; G01s 9/02
[58] Field of Search........ 178/7.6, 7.7, 7.5 SE, 7.55, 178/7.5 E, 7.2 D; 343/7.3, 7.4

[56] References Cited
UNITED STATES PATENTS
3,711,637    1/1973    Deye et al.................... 178/DIG. 21

Primary Examiner—Maynard R. Wilbur
Assistant Examiner—H. A. Birmiel
Attorney, Agent, or Firm—Richard S. Sciascia; Joseph M. St. Amand; T. M. Phillips

[57] ABSTRACT

The present invention relates to television target tracking systems and more particularly to television target tracking systems wherein the system tracks the center of the target.

9 Claims, 3 Drawing Figures

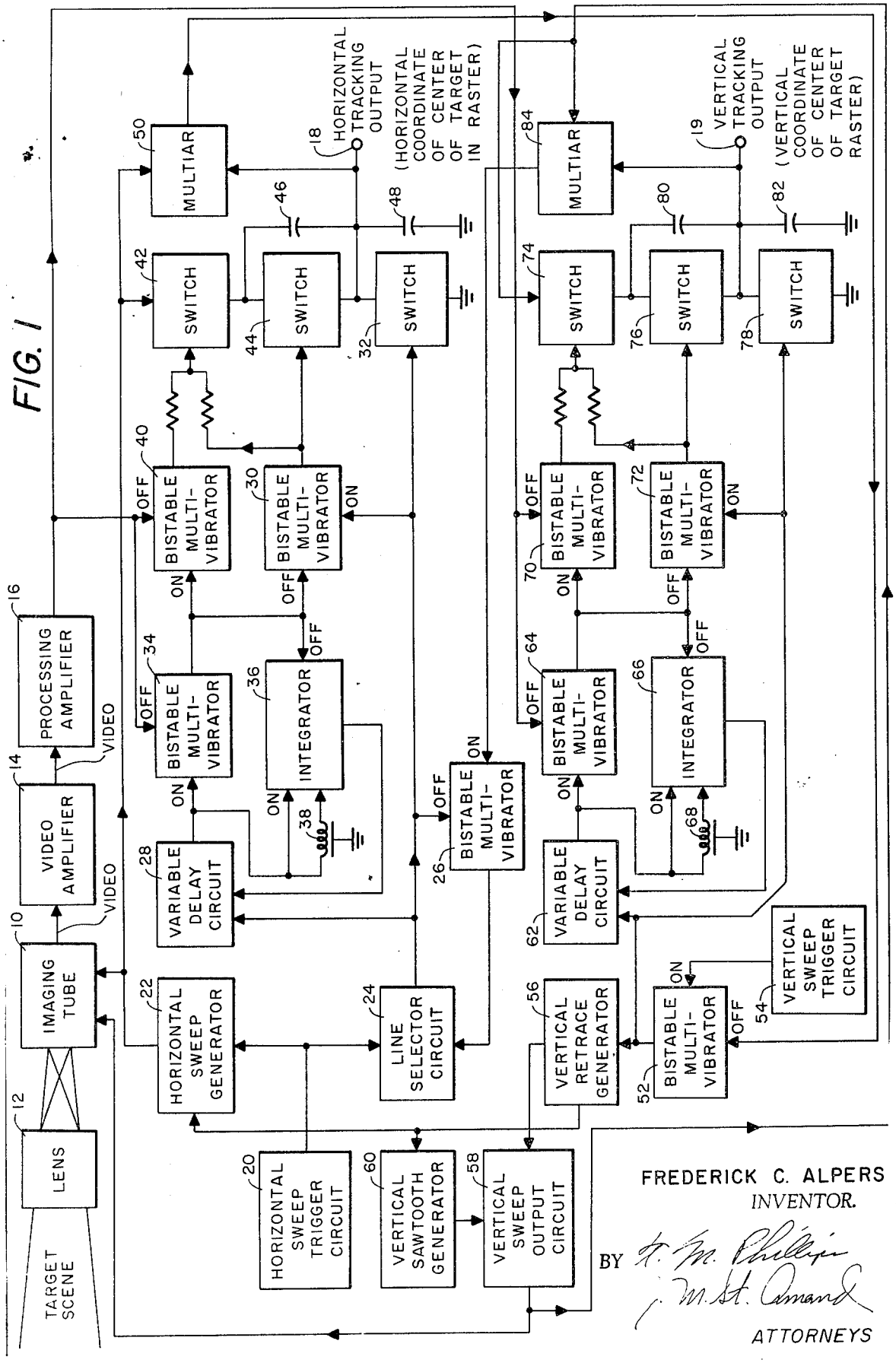
FIG. I

FREDERICK C. ALPERS
INVENTOR.

BY *F. M. Phillips*
*J. F. Timand*

ATTORNEYS

CENTER TRACKING ELECTRO-OPTICAL GUIDANCE SYSTEM

The invention herein described may be manufactured and used by or for the Government of the United States of America for governmental purposes without the payment of any royalties thereon or therefor.

The present invention involves a means for deriving directional information relative to a target by directing a television-type camera towards a target scene, scanning the target scene by employing a raster similar to that used in the well-known television applications, processing video information gained from the camera systems so as to derive a signal representing the center of the target.

In my co-pending application Ser. No. 79,469, filed Dec. 29, 1960, now U.S. Pat. No. 3,711,639 for Television Target Tracking System, the edges of the selected target were tracked. There are several advantages to tracking the center of the target rather than the edges: there is a greater probability of losing the target if the tracking action is concentrated precisely at an edge rather than about the center of the target; if the tracking information obtained concerns the center of the target a greater amount of motion or drift can be tolerated during interframe periods of any momentary interruption of tracking than can be tolerated if the information must be precisely associated with an edge of a target. A further advantage of center target tracking relates to the probable scatter of impacts of missiles about their aim points. In a normal distribution of scatter if the aiming point is the center of the target a greater number of missiles will actually hit the target than when the aiming point is some edge or corner of the target.

An object of the present invention is the provision of a television target tracking system which tracks on the center of a selected target.

Another object of the invention is to provide a television target tracking system which provides information on the exact position of the center of the target image within the raster, which information in turn gives knowledge of the position of the target image with respect to the camera, and thus the position of the target with respect to the flight axis of the missile or aircraft which carries the tracking system.

Other objects and many of the attendant advantages of this invention will become readily appreciated as the same becomes better understood by reference to the following detailed description when considered in connection with the accompanying drawings wherein:

FIG. 1 is a block diagram of a preferred embodiment of the invention.

Figure 3:
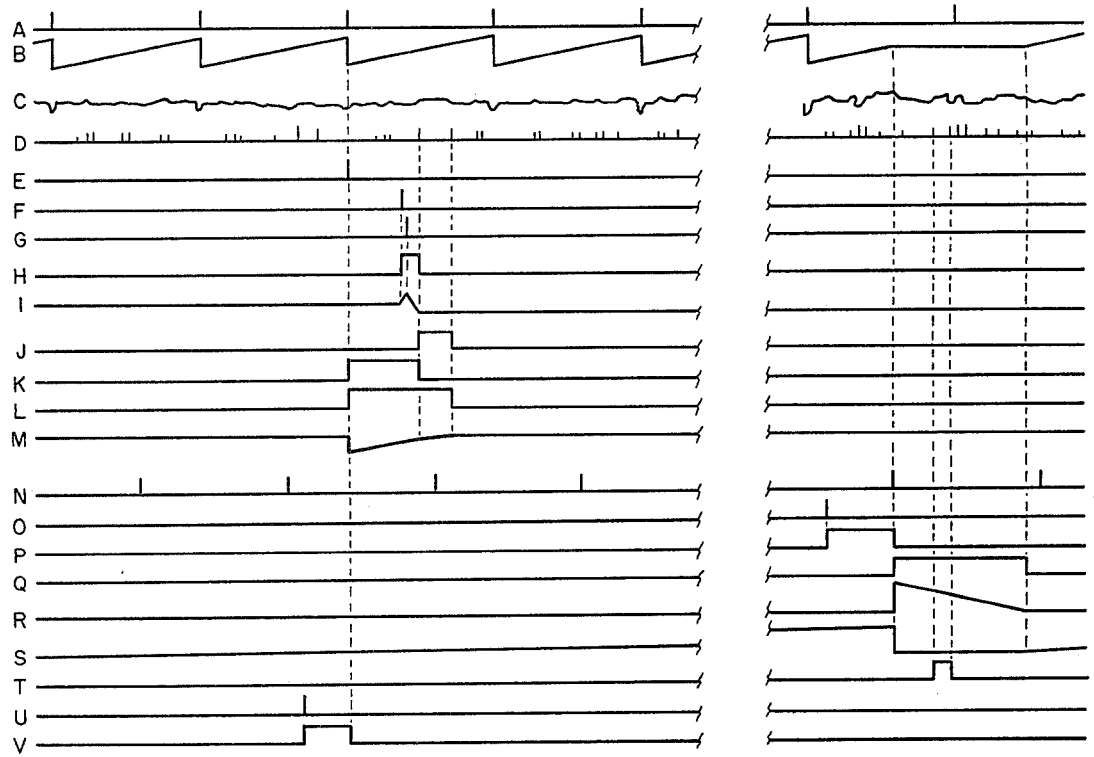
FIG. 3 shows the principle waveforms involved.

Referring now to the drawings there is shown in FIG. 1 an imaging tube 10 viewing a target scene through lens 12. Video information from imaging tube 10 is coupled to a video amplifier 14 which amplifies the video information and feeds it to a processing amplifier 16. The output signal from processing ampifier 16 is fed to the horizontal tracking circuit and the vertical tracking circuit for deriving horizontal and vertical tracking output signals at terminals 18 and 19 respectively. Horizontal sweep trigger circuit 20 supplies a trigger to horizontal sweep generator 22 which produces a sawtooth sweep that is coupled to imaging tube 10 to cause the scanning beam of imaging tube 10 to be deflected from left to right. Horizontal sweep trigger circuit 20 also supplies a trigger to line selector circuit 24. Line selector circuit 24 is controlled by bistable multi-vibrator 26. Coupled to the output of line selector circuit 24 is variable delay circuit 28, bistable multi-vibrator 26, bistable multi-vibrator 30 and switch 32. The output signal from variable delay circuit 28 is fed as an "on" signal to bistable multi-vibrator 34 and as an on signal to integrator 36. The output signal from variable delay circuit 28 is also fed through fixed delay 38 to provide a reversing signal to integrator 36. The output of integrator 36 is fed back as a second input to variable delay circuit 28. An "off" signal is fed from processing amplifier 16 to bistable multi-vibrator 34 for turning it off when differential video information appears at the output of processing amplifier 16. The output signal from bistable multi-vibrator 34 is fed as an on signal to bistable multi-vibrator 40 and as off signals to integrator 36 and bistable multi-vibrator 30. An off signal is fed to bistable multi-vibrator 40 from processing amplifier 16 in the same manner as the off signal is fed to bistable multi-vibrator 34. The outputs of bistable multi-vibrators 30 and 40 are fed as control signals to switch 42. The output signal from bistable multi-vibrator 30 is also fed as a control signal to switch 44. Switches 32, 42 and 44 are connected in series with the output from horizontal sweep generator 22 to control the amount of charge supplied to capacitors 46 and 48. The charge accumulated on capacitor 48 and appearing as the horizontal tracking output voltage at terminal 18 is proportional to the horizontal displacement O-X (FIG. 2).

The horizontal tracking output at terminal 18 provides a reference voltage which is compared in multiar 50 with the output voltage of horizontal sweep generator 22. When there is coincidence of the two input signals to multiar 50, an output signal is fed to bistable multi-vibrator 52. Bistable multi-vibrator 52 is turned on by a signal from vertical sweep trigger circuit 54 and turned off by the output signal from multiar 50. The output from bistable multi-vibrator 52 triggers vertical retrace generator 56 which supplies a clamping signal to horizontal sweep generator 22 and vertical sawtooth generator 60, and a sawtooth waveform to vertical sweep output circuit 58. A second control voltage is supplied to vertical sweep output circuit 58 from vertical sawtooth wave generator 60. Bistable multi-vibrator 52 also supplies an input signal to variable delay circuit 62 which supplies the on signal to bistable multi-vibrator 64 and integrator 66. A reversing signal is also supplied from variable delay circuit 62 to integrator 66 through fixed delay line 68. The output from integrator 66 is fed back to variable delay circuit 62 as the delay control. The output of bistable multi-vibrator 64 supplies an on signal to bistable multi-vibrator 70 and off signals to integrator 66 and bistable multivibrator 72. Off signals are coupled to bistable multivibrators 64 and 70 when an output signal appears at processing amplifier 16. The output of bistable multivibrators 70 and 72 are fed as control voltages to switch 74. The output signal from bistable multivibrator 72 is also fed as a control signal to switch 76. The on signal for bistable multi-vibrator 72 is supplied from bistable multi-vibrator 52. Bistable multi-vibrator 52 also supplies the control signal for switch 78. Switches 74, 76 and 78 are connected in series with the output of vertical sweep output circuit 58 to control the charging of capacitors 80 and 82. The charge stored on capacitor 82 represents the vertical displacement O-Y (FIG. 2) and appears as the vertical tracking output voltage at terminal 19. The voltage appearing at output terminal 20 is also used as a reference voltage for multiar 84 which compares this reference voltage with the output signal from vertical sweep output circuit 58 and generates an output signal when these two input signals are equal in amplitude, which output is fed as the on signal to bistable multivibrator 26.

In the following description of operation, it is assumed that the specific target to be tracked is selected by a human operator viewing the scene, who provides initial alignment of the tracking action with the desired target. Horizontal sweep trigger circuit 20 functions in much the same manner as its counterpart in a normal television camera; i.e., it supplies a trigger (Waveform A, FIG. 3), to the horizontal sweep generator 22, which produces a sawtooth sweep (Waveform B) that causes the beam in imaging tube 10 to be deflected from left to right. Horizontal sweep trigger circuit 20 also supplies a trigger to line selector circuit 24, which circuit selects the particular line in the raster (FIG. 2) during which the horizontal tracking action will take place. Line selector 24 is controlled by bistable multivibrator 26 whose output pulse (Waveform W) in effect gates line selector circuit 24 on for a short period of time so that its output consists of one horizontal trigger pulse only. The pulse which controls bistable multivibrator 26 is derived from the vertical tracking circuitry discussed below. The particular horizontal trigger pulse that is selected by line selector circuit 24 of the series of such pulses coming from horizontal sweep circuit 20 is then the output pulse from line selector circuit 24 (waveform E) and is used for a triggering action throughout the horizontal tracking circuitry.

Figure 2:
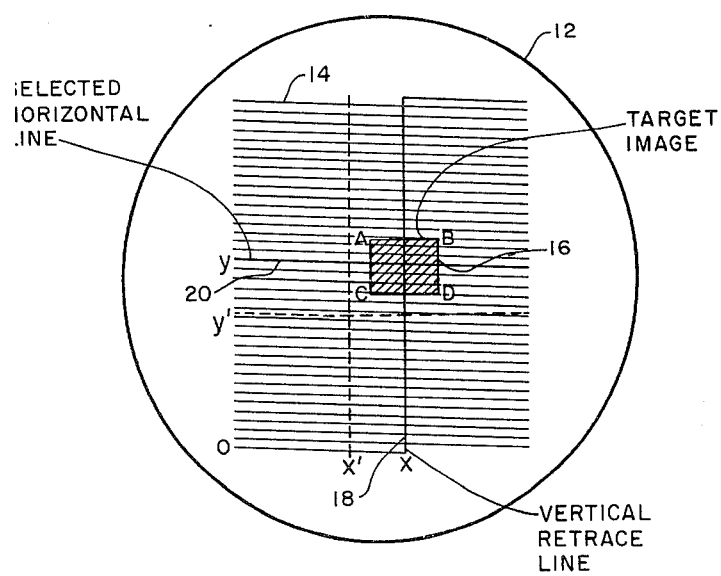
FIG. 2 shows the nature of center tracking of the system of FIG. 1.

Line selector circuit 24 supplies a trigger to variable delay circuit 28 which delivers an output pulse (Waveform F) that is delayed from the selected trigger pulse by a time equivalent to the time required for the scanning beam to move linearly from coordinate O to coordinate X' (See FIG. 2). The signal represented by Waveform F is used to turn on bistable multi-vibrator 34 which is turned off by the next edge signal from processing amplifier 16 (i.e., the edge signal generated by the passage of the scanning beam over the target edge A-C). The purpose of integrator 36 is to establish the coordinate X' at a position sufficiently close to the target image (but still to the left of the target image) so as to assure that the next edge encountered by the scanning beam after passing coordinate X' will be the target edge A-C. Integrator 36 is turned on by the output pulse from variable delay circuit 28 (Waveform F), which causes it to begin integration at a given rate in one direction. Waveform F is also passed through a fixed delay 38 and fed to integrator 36 as Waveform G which causes integrator 36 to reverse the direction of the integration and to begin integrating at the same rate in the opposite direction. This reverse integration is stopped by the trailing edge of the output pulse from bistable multi-vibrator 34 (Waveform H), which signifies the passage of the scanning beam over the target edge A-C and which clamps the action of the integrator 36. The amplitude of the output from integrator 36 (Waveform I) at the instant of clamping is retained and used to determine the amount of delay that will be applied by variable delay circuit 28 during the scanning of the selected horizontal line in the next frame. This combined action of variable delay circuit 28, bistable multi-vibrator 34, and integrator 36 thus serves to keep coordinate X' just to the left of the target edge A-C.

The trailing edge of the output pulse from bistable multi-vibrator 34 (Waveform H), which signifies the passage of the beam over edge A-C, also turns on bistable multi-vibrator 40, which is turned off by the next video edge signal generated by the passage of the beam over the target edge B-D. Bistable multi-vibrator 40 thus generates an output pulse (Waveform J) whose duration is exactly coincident with the time required for the scanning beam to pass from the target edge A-C to the target edge B-D. The trailing edge of Waveform H is also used to turn off bistable multi-vibrator 30, which was previously turned on by the selected line trigger pulse (Waveform E). Bistable multi-vibrator 30 thus generates an output pulse (Waveform K) whose duration is equivalent to the time required for the scanning beam to pass from the left side of the raster (coordinate O) to the target edge A-C.

Each of switches 42, 44 and 32 are normally in an open circuit condition except while its respective control pulse is being applied. Switch 42 is controlled by Waveform L, which is the sum of the outputs of bistable multi-vibrator 40 and bistable multi-vibrator 30 (i.e., Waveforms J and K); switch 42 is therefore closed throughout the time that the scanning beam is passing along the selected line from the left edge of the raster to the target edge B-D. Switch 44 is controlled by the output of bistable multi-vibrator 30 (Waveform K), and is therefore closed only during the time that the scanning beam is passing from the left edge of the raster to the target edge A-C. Switch 32 is controlled by the selected line trigger pulse (Waveform E), and is therefore closed only for an instant upon the arrival of that pulse from line selector circuit 24. The closure of switch 32 serves to remove all previous voltages from capacitor 48 and thus reduces the horizontal tracking output (Waveform M), to 0 at the start of the scanning of a new horizontal line. Switch 32 is opened again practically instantaneously, as switches 42 and 44 are being closed by their respective control pulses. With switches 42 and 44 closed and switch 32 open, charge from horizontal sweep generator (Waveform B) flows through switches 42 and 44 and accumulates on capacitor 48. Since these switches are of very low impedance when in their closed position, capacitor 48 essentially charges to the exact output voltage of horizontal sweep generator 22 during the time that both switches are closed, i.e., during the time required for the beam to scan from the left edge of the raster to the target edges A-C, which time is represented by the duration of Waveform K. The voltage accumulated on capacitor 48 during this time is thus directly proportional to the precise amount that the beam is being deflected in imaging tube 10 by means of the horizontal deflection action. When the scanning beam reaches target edge A-C, Waveform K is terminated and switch 44 is opened, but switch 42 continues to be closed by Waveform L during the time required for the beam to scan from target edge A-C to target edge B-D. As a result, during this time the horizontal sweep waveform is applied across capacitors 46 and 48 in series. Since, for center tracking, capacitors 46 and 48 are made exactly equal in capacitance, the rate at which charge and consequently voltage accumulates on capacitor 48 during this period is proportional to only one-half the rate of increase in the horizontal sweep voltage. (This change in rate is indicated by the change in slope of the Waveform M diagram, though the small size of the diagram may prevent it from being readily apparent that the angle of the slope in the latter part of Waveform M is reduced to one-half the angle of the slope in the earlier portion.) When switch 42 is opened by the termination of its control pulse, capacitor 48 is left with a voltage equal to that necessary to sweep the beam from the left edge of the raster to target edge A–C, plus one-half of that necessary to sweep on across the target to the edge B–D. The peak voltage generated is thus proportional to the distance from the left edge of the raster to coordinate X, and constitutes the desired coordinate information regarding the position of the center of the target in the horizontal dimension. The stated voltage appears as an output voltage at terminal 18.

Referring now to the vertical tracking circuitry, vertical sweep trigger circuit 54 which may be similar to that employed in a conventional television type camera is used to control the timing of the vertical scan of imaging tube 10. Trigger circuit 54 provides an output pulse (Waveform O) which turns on bistable multi-vibrator 52, and the latter is turned off by the first pulse thereafter from multiar 50. The pulse from multiar 50 comes when, on horizontal scanning lines subsequent to the horizontal tracking line, the horizontal sweep voltage (Waveform B) becomes precisely equal to the horizontal tracking output signal appearing at terminal 18; i.e., after the horizontal tracking line, a pulse is generated by multiar 50 whenever the scanning crosses the coordinate X. The trailing edge of the resulting output pulse from multi-vibrator 52 (Waveform P) triggers vertical retrace generator 56 and causes it to begin generating output voltages at the point representing the intersection of the desired vertical retrace line with the bottom of the raster.

The output voltages from retrace generator 56 are shown as Waveforms Q and R. Waveform Q is used as a clamping signal, and is applied both to horizontal sweep generator 22 and to vertical sawtooth generator 60. When rectangular waveform Q is applied to horizontal sweep generator 22, the action of this circuit is stopped throughout the duration of the vertical tracking action (See FIG. 2). This is necessary to permit scanning the beam upward through the target without encountering any simultaneous horizontal motion due to the action of the horizontal sweep. Waveform signal Q is applied to vertical sawtooth generator 60 for a double purpose. First, it causes the output of generator 60 (the slow vertical trace shown in Waveform S) to return to O; and second, it clamps this waveform at O until the proper time to start a new vertical sweep down through the raster as the horizontal lines are again being scanned.

The sawtooth waveform signal from retrace generator 56 (Waveform R) and the much slower sawtooth waveform signal from generator 60 (Waveform S) are combined in vertical sweep output circuit 58. Vertical sweep output circuit 58 may be an arrangement of two diodes which takes the sum of the trace and retrace waveforms, or, with some loss of amplitude, it may be a simple summing network similar to that used at the inputs to switches 42 and 74. The sum signal (Waveform T) appears at the output of vertical sweep output circuit 58 which causes the scanning beam to sweep gradually down through the raster with vertical sawtooth generator 60 controlling the sweep, and then (at the point where vertical retrace generator 56 takes control) causing a sweepback up through the center of the target.

As the beam is guided up through the target in the course of the vertical retrace, the units of the vertical tracking circuit function in a manner analogous to that of the corresponding units of the horizontal tracking circuitry described above. The basic action is that of obtaining the gate represented by the output (Waveform U) of bistable multi-vibrator 70 which in effect defines the target edge of interest, and then through the action of the associated multi-vibrators and switches, controlling the voltage accumulated on capacitor 82 to obtain a vertical tracking output voltage corresponding to the horizontal tracking output described above. The output pulse from multiar 84 (Waveform V) is generated when the input from the vertical sweep moving in a downward direction becomes precisely equal to the reference voltage from capacitor 82 and terminal 19, and the stated output signifies that the scanning has reached the coordinate Y which is the center of the target in the vertical dimension. Output pulse V is coupled to bistable multi-vibrator 26 and serves to initiate the horizontal tracking action along the particular horizontal line which passes through the center of the target as determined in the vertical dimension.

Initial lock-on to a desired target may be effected by using a relay to inject externally supplied d-c control voltages on the delay control leads associated with variable delay circuits 28 and 62, respectively. This permits the operator to establish coordinates X' and Y' in the form of voltages stored by integrators 36 and 66, and thereby determines which target is to be tracked. When the relay connection from the external control (or "slew") voltages is broken, tracking of the target commences automatically.

Obviously many modifications and variations of the present invention are possible in the light of the above teachings. It is therefore to be understood that within the scope of the appended claims the invention may be practiced otherwise than as specifically described.

What is claimed is:

1. In a television type target tracking system for homing on the center of a target, the combination comprising:
   a. raster generator circuit means including a horizontal sweep generator and a vertical sweep generator,
   b. television camera means coupled to said horizontal and vertical sweep generators for generating an output signal proportional to changes in contrast of its raster,
   c. first circuit means for gating one horizontal sweep of said raster each time the target scene is scanned,
   d. second circuit means coupled to said gating circuit means, said horizontal sweep generator and to the output of said television camera means for charging a capacitor proportional to the voltage required to deflect the selected scan raster to the center of the target being tracked,
   e. third circuit means coupled to said vertical sweep generator and to the output of said television camera means for charging a capacitor proportional to the retrace voltage required to return the selected scan to the center of the target being tracked.

2. The system of claim 1 wherein said second circuit means includes:
 a. first and second capacitors,
 b. first and second switch means coupled to said first and second capacitors and being responsive to said gated scan for connecting said first capacitor across the output of said horizontal sweep generator from the beginning of the sweep until an output signal appears at the output of said television camera means, and connecting said first and second capacitors in series across the output of said horizontal sweep generator for the duration of said output signal from said television camera means.

3. The system of claim 2 wherein said first and second capacitors are of equal capacitance.

4. The system of claim 1 wherein said second circuit comprises:
 a. a first variable delay circuit coupled to said gating circuit means for delaying the output signal a predetermined time interval,
 b. first, second, third and fourth bi-stable multivibrators,
 c. said first multivibrator having a first input coupled to the output of said first variable delay circuit and being responsive to the output of said variable delay for generating an output signal and a second input coupled to the output of said television camera means and being turned off in response to a signal received at said second input,
 d. said second multivibrator having a first input coupled to the output of said first multivibrator and a second input coupled to the output of said television camera means and being turned on by the output signal from said first multivibrator and being turned off by the signal received from said television camera means,
 e. said third multivibrator having a first input coupled directly to the output of said gating circuit means and a second input coupled to the output of said second multivibrator and being turned on by the output signal from said gating circuit means and being turned off by the output signal from said second multivibrator,
 f. summing circuit means coupled to the outputs of said second and third multivibrators and to said first switching means for coupling the outputs of said second and third multivibrators as a controlling signal to said first switching means,
 g. circuit means coupling the output of said third multivibrator to said second switching means for providing a control signal for said second switching means,
 h. a first comparison circuit for generating an output signal when the vertical deflection voltage equals the charge on said capacitor,
 i. said fourth multivibrator being coupled to said gating circuit and to said first comparison circuit and generating an output signal to gate open said gating circuit in response to an output from said first comparison circuit and to gate close said gating circuit in response to an output signal from said gating circuit.

5. The system of claim 1 wherein said third circuit means includes:
 a. second and fourth capacitors,
 b. third and fourth switch means coupled to said second and fourth capacitors and being responsive to the initiation of the vertical deflection voltage for connecting said first capacitor across the output of said vertical sweep generator from the beginning of the sweep until an output signal appears at the output of television camera means, and connecting said third and fourth capacitors in series across the output of said vertical sweep generator for the duration of said output signal from said television camera means.

6. The system of claim 4 wherein said third and fourth capacitors are of equal capacitance.

7. The system of claim 1 wherein said third circuit comprises:
 a. a vertical retrace generator having an input coupled to the output of a fifth bi-stable multivibrator and two outputs for generating a sawtooth waveform signal in response to an output from said fifth multivibrator,
 b. a vertical sawtooth generator for generating an output sawtooth waveform of one-half the frequency of the output signal from said vertical retrace generator,
 c. a vertical sweep output circuit coupled to said vertical retrace generator and to said vertical sawtooth generator for producing an output signal that causes the scanning beam to sweep gradually down through the raster with said vertical sawtooth generator controlling the sweep, and when a signal is generated by said vertical retrace generator to sweep back up through the center of the target,
 d. a second variable circuit coupled to said fifth multivibrator for delaying the output signal a predetermined time interval,
 e. sixth, seventh and eighth bi-stable multivibrators,
 f. said sixth multivibrator having a first input coupled to the output of said second variable delay circuit and being responsive to the output of said variable delay for generating an output signal and a second input coupled to the output of said television camera means and being turned off in response to a signal received at said second input,
 g. said seventh multivibrator having a first input coupled to the output of said sixth multivibrator and a second input coupled to the output of said television camera means and being turned on by the output signal from said sixth multivibrator and being turned off by the signal received from said television camera means,
 h. said eighth multivibrator having a first input coupled directly to the output of said fifth multivibrator and a second input coupled to the output of said seventh multivibrator and being turned on by the output signal from said fifth multivibrator and being turned off by the output signal from said seventh multivibrator,
 i. summing circuit means coupled to the output of said seventh and eighth multivibrators and to said third switching means for coupling the outputs of said seventh and eighth multivibrators as a controlling signal to said third switching means,
 j. circuit means coupling the output of said eighth multivibrator to said fourth switching means for providing a control signal for said fourth switching means,
 k. a second comparison circuit for generating an output signal to turn off said fifth multivibrator when the horizontal deflection voltage equals the charge on said capacitor.

8. The system of claim 1 wherein a clamping signal is fed from the vertical tracking circuit to the horizontal tracking circuit to prevent interference from the horizontal tracking circuit during the vertical tracking function.

9. The system of claim 1 wherein means are provided to return said capacitor to ground before each tracking function.

* * * * *